United States Patent
Konakai et al.

(10) Patent No.: US 10,076,941 B2
(45) Date of Patent: Sep. 18, 2018

(54) HYDRAULIC SHOCK ABSORBER AND COVER MEMBER

(71) Applicant: Showa Corporation, Gyoda (JP)

(72) Inventors: Seiryo Konakai, Gyoda (JP); Satomi Hojo, Gyoda (JP)

(73) Assignee: SHOWA CORPORATION, Gyoda (JP)

( * ) Notice: Subject to any disclaimer, the term of this patent is extended or adjusted under 35 U.S.C. 154(b) by 0 days.

(21) Appl. No.: 14/974,604

(22) Filed: Dec. 18, 2015

(65) Prior Publication Data

US 2016/0101662 A1    Apr. 14, 2016

Related U.S. Application Data

(63) Continuation of application No. PCT/JP2013/004317, filed on Jul. 12, 2013.

(51) Int. Cl.
*F16F 9/36* (2006.01)
*B60G 13/08* (2006.01)
(Continued)

(52) U.S. Cl.
CPC .............. *B60G 13/08* (2013.01); *F16F 9/185* (2013.01); *F16F 9/3242* (2013.01); *F16F 9/36* (2013.01);
(Continued)

(58) Field of Classification Search
CPC .......... F16F 9/364; F16F 9/3242; F16F 9/362; F16F 9/36; F16F 9/363
See application file for complete search history.

(56) References Cited

U.S. PATENT DOCUMENTS

| 2,324,058 A | 7/1943 | Boor et al. |
| 2,338,162 A * | 1/1944 | Boor .................... F16F 9/3484 188/320 |

(Continued)

FOREIGN PATENT DOCUMENTS

| CN | 201547168 U | 8/2010 |
| DE | 2111713 A | 9/1972 |

(Continued)

OTHER PUBLICATIONS

Lutz (DE 2111713 A1), English-language translation. (Year: 1972).*

(Continued)

*Primary Examiner* — Bradley T King
*Assistant Examiner* — Stephen M Bowes
(74) *Attorney, Agent, or Firm* — Leason Ellis LLP

(57) ABSTRACT

The hydraulic shock absorber includes a cylinder containing a fluid, a damper case positioned outside the cylinder to form a reserving chamber, a piston housed inside the cylinder, a piston rod supporting the piston, a rod guide covering one end of the cylinder, and a guide bushing provided with a through hole through which the piston rod penetrates. The rod guide has an outer circumferential groove formed by spacing apart at least a part of the rod guide from the cylinder in a circumferential direction of the cylinder for allowing the fluid to flow from inside of the cylinder to the reserving chamber, and has an inner circumferential groove for supplying the fluid into an inner circumferential gap between an inner circumferential surface of the guide bushing and an outer circumferential surface of the piston rod as the fluid flows through the outer circumferential groove.

5 Claims, 11 Drawing Sheets

(51) Int. Cl.
*F16F 9/18* (2006.01)
*F16F 9/32* (2006.01)

(52) U.S. Cl.
CPC ...... *B60G 2202/24* (2013.01); *B60G 2206/41* (2013.01); *B60G 2500/10* (2013.01); *F16F 2222/12* (2013.01); *F16F 2238/04* (2013.01)

(56) References Cited

U.S. PATENT DOCUMENTS

| | | | | |
|---|---|---|---|---|
| 3,199,637 | A | * | 8/1965 | Herman ................ F16F 9/3242 188/318 |
| 3,520,384 | A | | 7/1970 | Nicholls |
| 4,287,970 | A | * | 9/1981 | Eusemann ............. F16F 9/364 188/269 |
| 4,647,026 | A | | 3/1987 | Siemann et al. |
| 4,955,460 | A | * | 9/1990 | Lizell ....................... F16F 9/42 188/281 |
| 2005/0056504 | A1 | | 3/2005 | Holiviers |

FOREIGN PATENT DOCUMENTS

| | | |
|---|---|---|
| FR | 1198818 A | 12/1959 |
| FR | 2267488 A | 11/1975 |
| GB | 2164119 A | 3/1986 |
| JP | 56-046135 A | 4/1981 |
| JP | 56-46153 A | 4/1981 |
| JP | 2007-506055 A | 3/2007 |

OTHER PUBLICATIONS

International Search Report dated Mar. 24, 2014 for the corresponding PCT Application No. PCT/JP2013/004317.

Office Action dated Jul. 20, 2016 for the corresponding Chinese Patent Application No. 201380077754.0.

* cited by examiner

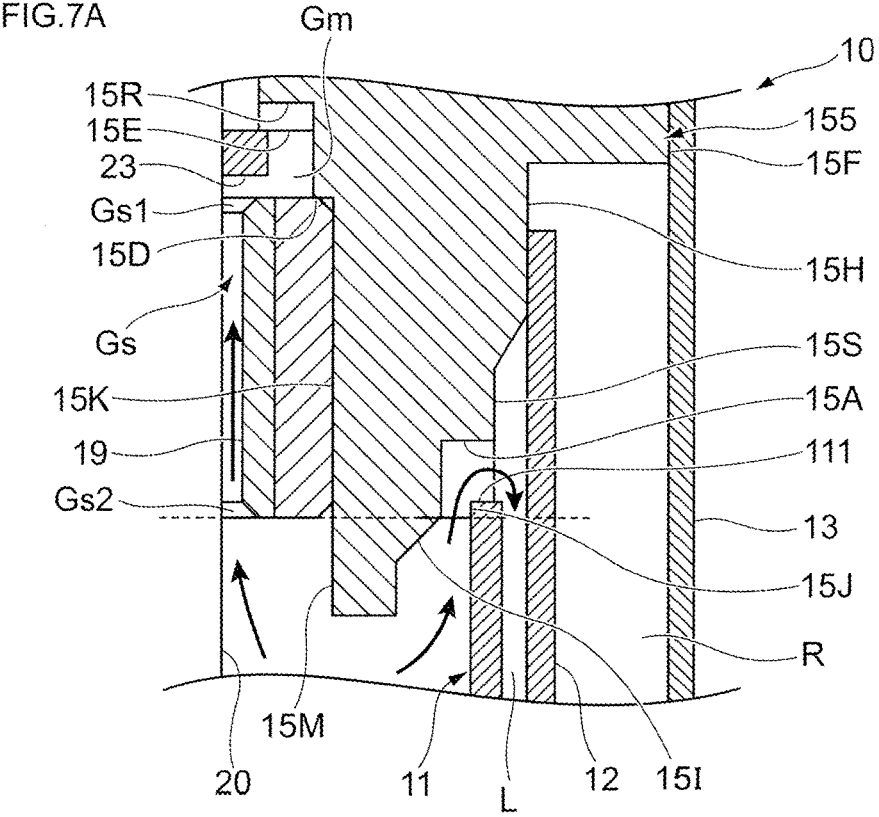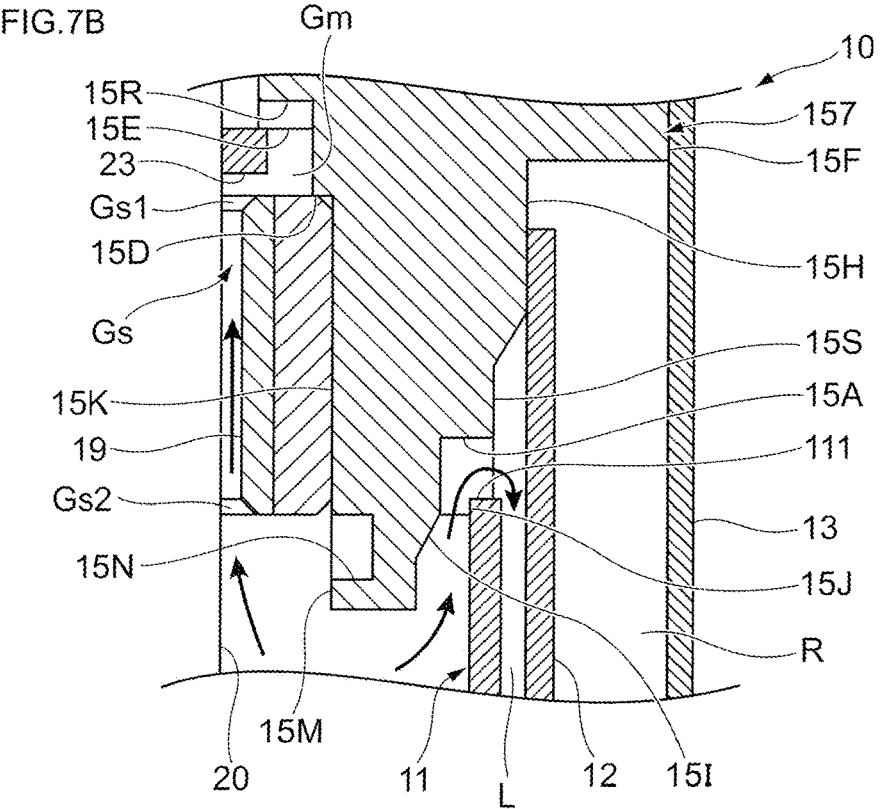

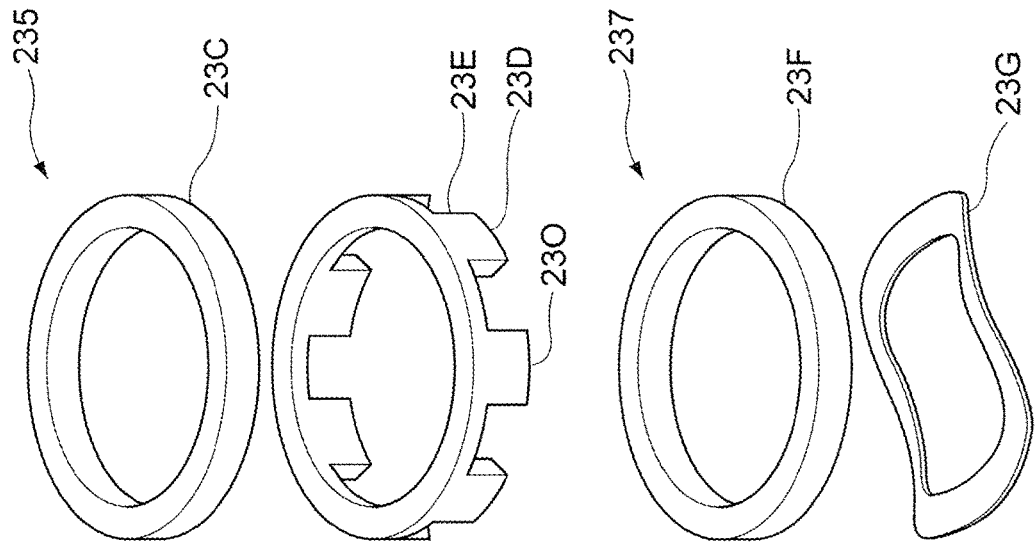

HYDRAULIC SHOCK ABSORBER AND COVER MEMBER

CROSS REFERENCE TO RELATED APPLICATION

This is a continuation of International Application No. PCT/JP2013/004317 filed on Jul. 12, 2013, the entire disclosure of which is incorporated herein by reference.

BACKGROUND

1. Technical Field

The present invention relates to a hydraulic shock absorber and a cover member.

2. Related Art

Suspension devices for vehicles such as automobiles include a hydraulic shock absorber for appropriate dampening of vibration transmitted to the vehicle body from the road surface during the drive with the use of a damping force generator so as to improve the driving comfort and control stability. A hydraulic shock absorber includes a piston that is movably disposed inside a cylinder, for example, and divides the inside of the cylinder, a piston rod connected to the piston, and a fluid reserving chamber that compensates for volume changes of oil as the piston rod moves. A damping force is generated by giving resistance to the flow of fluid caused by the movement of the piston.

A triple tube shock absorber 908 is known (Japanese Translation of PCT Application No. 2007-506055), for example, which includes a pressure tube (first cylinder) 916, an intermediate tube 944, and a reserve tube 918, as shown in FIG. 10. This shock absorber 908 includes a rod guide (cover member) 936 that covers the pressure tube 916 at one end of the pressure tube 916 where the piston rod 914 protrudes, and that has a through hole for the piston rod 914 to extend through to support the piston rod 914 in contact therewith. A circumferential part of this rod guide 936 is apart from the pressure tube 916 to form a passage (opening) 956 that allows the fluid to flow from inside of the pressure tube 916 into a reserve chamber (fluid reserving chamber) 938 through an intermediate chamber 952.

SUMMARY OF THE INVENTION

In a configuration such as that of Japanese Translation of PCT Application No. 2007-506055 in which an opening is formed in the cover member to allow the fluid to flow from inside of the first cylinder to the fluid reserving chamber, the velocity of the fluid inside the first cylinder may increase near the opening. Therefore, inside the first cylinder, the fluid pressure may be lower near the opening of the cover member.

If the pressure of the fluid is higher in a gap between an outer circumference of the piston rod and an inner circumference of the through hole in the cover member compared with the lowered pressure of the fluid near the opening, the fluid may not flow into the gap, or may flow out of the gap toward the opening. Because of these, there has been a possibility of lack of sufficient fluid in the gap, which results in wear of the cover member.

Illustrative aspect(s) of an exemplary embodiment is to prevent wear of the cover member and to improve the durability of the hydraulic shock absorber.

Solution to Problem

An aspect of the embodiment provides a hydraulic shock absorber, including: a first cylinder containing a fluid; a second cylinder positioned outside the first cylinder and forming a fluid reserving chamber that reserves the fluid between the second cylinder and the first cylinder; a piston housed inside the first cylinder; a piston rod supporting the piston, a part of the piston rod protruding from the first cylinder; and a cover member covering one end of the first cylinder from which the piston rod protrudes, and having a through hole through which the piston rod penetrates, wherein at least a part of the cover member in a circumferential direction of the first cylinder is apart from the first cylinder to form an opening through which the fluid flows from inside of the first cylinder to the fluid reserving chamber; and the cover member includes fluid supply unit that supplies the fluid to a gap between an inner circumferential surface of the through hole and an outer circumferential surface of the piston rod.

With the above configuration, a lack of fluid in the gap between the inner circumferential surface of the through hole and the outer circumferential surface of the piston rod is prevented, thereby friction force between the inner circumferential surface of the through hole and the outer circumferential surface of the piston rod can be reduced.

Another aspect of the embodiment provides a cover member covering one end of a cylinder which contains a fluid and from which a piston rod that supports a piston housed in the cylinder protrudes, the cover member having a through hole through which the piston rod penetrates, including an opening formed by recessing at least a part of the cover member to be apart from the cylinder in a circumferential direction of the cylinder in a surface facing the cylinder for allowing the fluid contained in the cylinder to flow out of the cylinder, and a fluid supply unit that supplies the fluid to a gap between an inner circumferential surface of the through hole and an outer circumferential surface of the piston rod.

With the above configuration, a lack of fluid in the gap between the inner circumferential surface of the through hole in the cover member and the outer circumferential surface of the piston rod is prevented, thereby friction force between the inner circumferential surface of the through hole and the outer circumferential surface of the piston rod can be reduced.

With any one of the aspects discussed above, wear of the cover member is prevented, so that the hydraulic shock absorber can have higher durability.

BRIEF DESCRIPTION OF THE DRAWINGS

FIG. 4-2B is an enlarged view seen from the inside of the rod guide of the exemplary embodiment, and FIG. 4-2C is a view seen from the direction of an arrow IVc in FIG. 4-2B.

FIG. 7A and FIG. 7B are diagrams illustrating a modified example 2 of the rod guide.

FIG. 8A to FIG. 8D are diagrams illustrating modified examples of a resin ring.

DETAILED DESCRIPTION OF THE INVENTION

Hereinafter, an exemplary embodiment of the present invention will be described in detail with reference to the accompanying drawings.

(Suspension Device 100)

Figure 1:
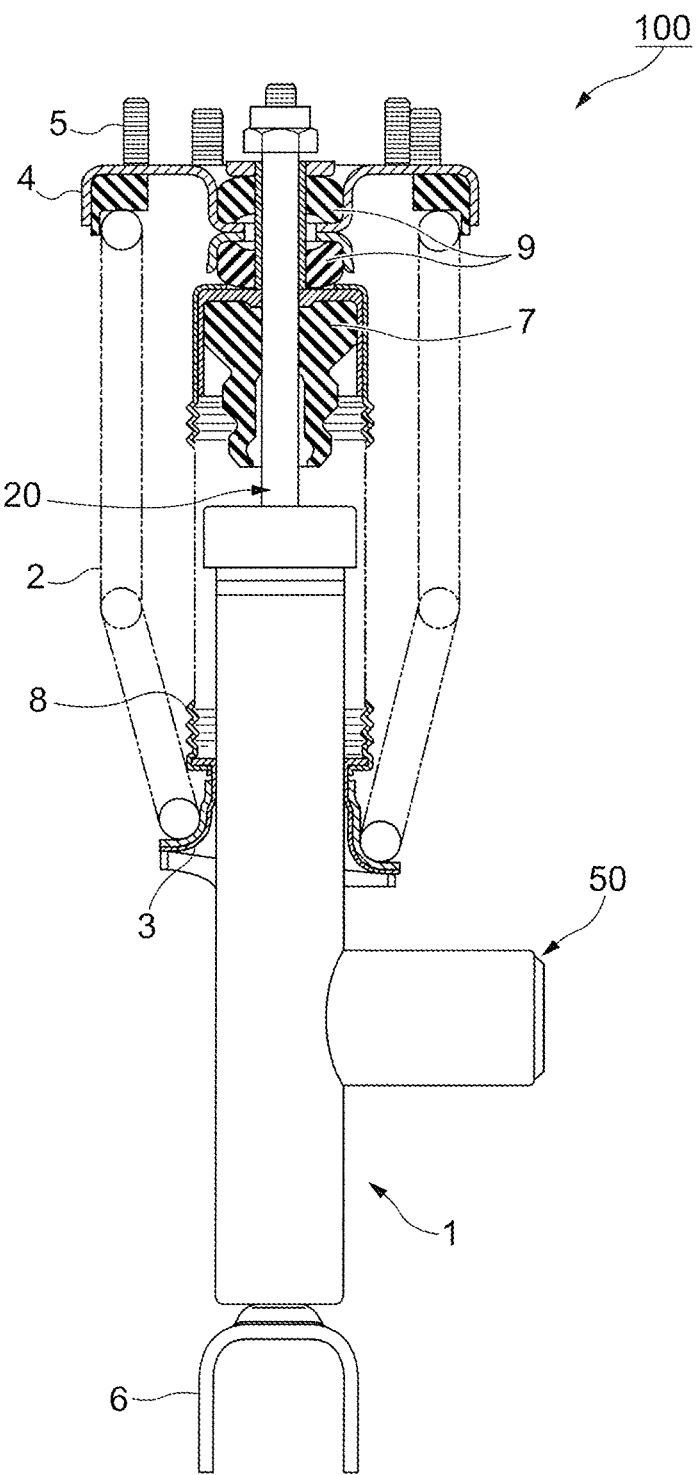
FIG. 1 is a schematic diagram illustrating the configuration of a suspension device according to the exemplary embodiment.

FIG. 1 is a schematic diagram illustrating the configuration of a suspension device 100 according to the exemplary embodiment.

The suspension device 100 includes, as shown in FIG. 1, a hydraulic shock absorber 1 and a coil spring 2 disposed outside the hydraulic shock absorber 1. The coil spring 2 is supported by spring seats 3 and 4 provided at both ends thereof. The suspension device 100 has bolts 5 to be attached to a vehicle body or the like, and a wheel side attachment part 6 provided below the hydraulic shock absorber 1.

The suspension device 100 also includes a bump rubber 7 press-fitted on an outer circumference of the piston rod 20 to be described later that protrudes from the hydraulic shock absorber 1. The suspension device 100 has an accordion-shaped dust cover 8 covering a part of the hydraulic shock absorber 1 and the outer circumference of the piston rod 20 protruding from the hydraulic shock absorber 1. The suspension device 100 further includes plural mount rubbers 9 (two in the exemplary embodiment) which are arranged in up and down direction at an upper end of the piston rod 20 and absorb vibration.

(Hydraulic Shock Absorber 1)

Figure 2:
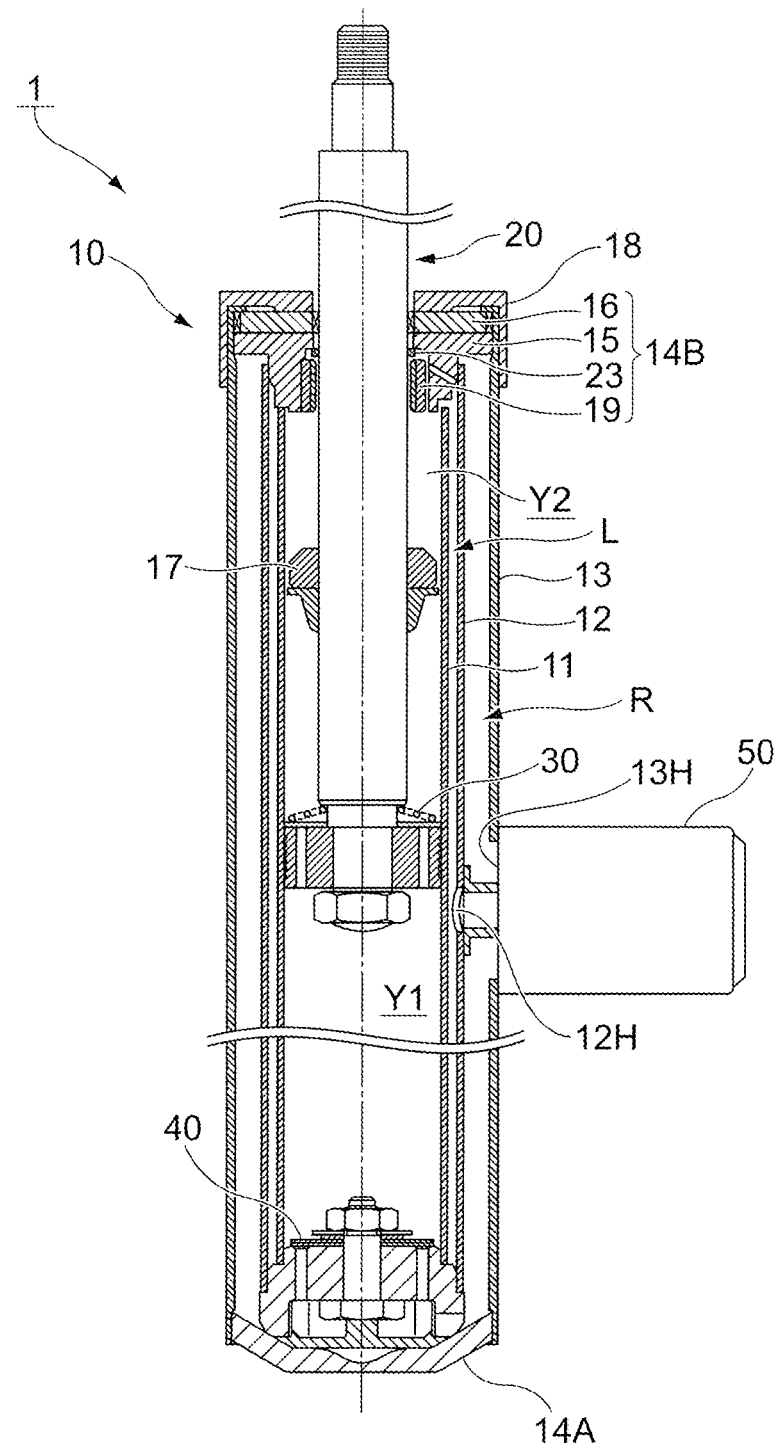
FIG. 2 is a diagram illustrating the whole configuration of a hydraulic shock absorber in the exemplary embodiment.

FIG. 2 is a diagram illustrating the whole configuration of the hydraulic shock absorber 1 of the exemplary embodiment.

The hydraulic shock absorber 1 includes, as shown in FIG. 2, a cylinder part 10, the piston rod 20, a piston 30, a bottom valve 40, and an external valve 50.

The cylinder part 10 has a so-called triple tube structure in which a cylinder 11 as an example of a first cylinder, an outer tube 12 as an example of a third cylinder provided at the outer side of the cylinder 11, and a damper case 13 as an example of a second cylinder provided at the further outer side of the outer tube 12. These cylinder 11, outer tube 12, and damper case 13 are arranged concentric (coaxial) to each other.

The cylinder part 10 further includes a bottom lid 14A closing one axial end of the damper case 13, an upper lid 14B closing the other axial end of the damper case 13, a rebound stopper 17 restricting the movement range of the piston rod 20, and a bump stopper cap 18 mounted at the other axial end of the damper case 13.

In the following description, the center axis direction of the cylindrical damper case 13 (up and down direction in FIG. 2) may be referred to simply as "axial direction". The lower end in the axial direction of the damper case 13 in the drawings may be referred to as "one end" or "one side", and the upper end in the axial direction of the damper case 13 in the drawings may be referred to as "the other end" or "the other side".

The cylinder 11 is a thin cylindrical member. The cylinder 11 contains oil inside thereof. The piston 30 and a part of the piston rod 20 are arranged movable inside the cylinder 11.

The outer tube 12 is a thin cylindrical member. The outer tube 12 is provided outside the cylinder 11 and inside the damper case 13. The outer tube 12 is positioned so that its inner circumference is apart from the outer circumference of the cylinder 11 with a predetermined distance.

This outer tube 12 forms a fluid communication path L between itself and the cylinder 11 for oil to travel between the inside of the cylinder 11 and a reserving chamber R to be described later. The outer tube 12 further has an outer tube opening 12H at a position facing the external valve 50.

The damper case 13 is a thin cylindrical member. The damper case 13 is formed longer than the cylinder 11 and the outer tube 12, and houses the cylinder 11 and the outer tube 12 inside thereof in an axial and a radial direction. The damper case 13 is positioned so that its inner circumference is apart from the outer circumference of the outer tube 12 with a predetermined distance.

Between this damper case 13 and the outer tube 12, the reserving chamber R is formed, which is an example of a fluid reserving chamber that compensates for the volume of oil substantially equal to the volume of back and forth movement of the piston rod 20, by receiving oil from the cylinder 11 or supplying oil to the cylinder 11. The damper case 13 further has a case opening 13H at a position where the external valve 50 is to be attached.

The bottom lid 14A is attached to one end of the damper case 13 to close the one end of the damper case 13. The bottom lid 14A supports the bottom valve 40, as well as the cylinder 11 and the outer tube 12 via the bottom valve 40, at one axial end of the damper case 13.

The upper lid 14B is provided to cover the other end of the cylinder 11, outer tube 12, and damper case 13. This upper lid 14B will be described in more detail later.

The rebound stopper 17 is a cylindrical member. The rebound stopper 17 is provided around the piston rod 20. The rebound stopper 17 restricts the movement of the piston rod 20 beyond a certain point toward the other axial end, in the extension stroke of the suspension device 100.

A bump stopper cap 18 is provided to the other end of the damper case 13, which is covered by the upper lid 14B, to further cover the damper case 13 from outside. The bump stopper cap 18 protects the other end of the hydraulic shock absorber 1 when the hydraulic shock absorber 1 is hitted against the bump rubber 7 (see FIG. 1), in the compression stroke of the suspension device 100.

The piston rod 20 is disposed to extend in an axial direction in the cylinder 11 as shown in FIG. 2. The other axial end of the piston rod 20 protrudes from the other end of the cylinder 11. The piston rod 20 is connected to the piston 30 at one end thereof in the axial direction.

The piston 30 is disposed so as to be slidable in the axial direction inside the cylinder 11. The piston 30 provided in the cylinder 11 divides the space inside the cylinder 11 into a first oil chamber Y1 and a second oil chamber Y2. The piston 30 has a passage for the oil to flow between the first oil chamber Y1 and the second oil chamber Y2.

The bottom valve 40 is attached to the one end of the damper case 13 and supports the cylinder 11 and the outer tube 12. The bottom valve 40 provided to the damper case 13 separates the first oil chamber Y1 from the reserving chamber R. The damper case 13 has a passage for the oil to flow between the first oil chamber Y1 and the reserving chamber R.

The external valve 50 is provided to a side of the damper case 13. More specifically, the external valve 50 is positioned opposite the flow passage of the oil flowing from the fluid communication path L inside the outer tube 12 to the reserving chamber R in the damper case 13. The external valve 50 changes the flow path area of oil to adjust the damping force to be generated. The external valve 50 may be, for example, composed of a solenoid valve.

(Upper Lid 14B)

The upper lid 14B will be described in more detail.

The upper lid 14B includes a rod guide 15 that guides the piston rod 20, an oil seal 16 that prevents oil leakage from the cylinder part 10 or entrance of foreign matters into the cylinder part 10, a guide bushing 19 that slidably supports the piston rod 20, and a resin ring 23 that limits the amount of oil flowing out from between the guide bushing 19 and the piston rod 20.

The rod guide 15, the oil seal 16, the guide bushing 19, and the resin ring 23 are arranged concentrically, and the piston rod 20 penetrates through these components.

The rod guide 15 will be described later in more detail.

The oil seal 16 has a cylindrical shape as a whole. In a specific example shown in the figure, the oil seal 16 is fixed to a clamped portion formed at the other end of the damper case 13.

The guide bushing 19 has a cylindrical shape as a whole. The guide bushing 19 is supported by the rid guide 15 with the inner circumference of the rod guide 15. In a specific example shown in the figure, the guide bushing 19 is fixed to the rod guide 15 by being press-fitted into the inner circumference of the rod guide 15.

The guide bushing 19 is formed to have a larger inner diameter than the outer diameter of the piston rod 20.

The guide bushing 19 is made of a metal material such as iron, for example. A contacting portion of the guide bushing 19 that contacts the piston rod 20 is processed with a coating of resin such as Teflon (Trademark registered in Japan).

The guide bushing 19 is an example of an annular portion, and a component having a through hole for the piston rod 20 to penetrate through.

The resin ring 23 has a cylindrical shape as a whole. The piston rod 20 penetrates through the resin ring 23. The resin ring 23 is provided on the inner circumference of the rod guide 15 and closer to the other axial end than the guide bushing 19. In a specific example shown in the figure, the resin ring 23 is arranged movable in the axial direction between a second receiving portion 15E of the rod guide 15 (see FIG. 3 to be described later) and the guide bushing 19.

The resin ring 23 is made of a resin material such as Teflon (Trademark registered in Japan).

The resin ring 23 is formed to have a smaller inner diameter than the inner diameter of the guide bushing 19. Therefore, with the piston rod 20 penetrating through the resin ring 23 and the guide bushing 19, the radial distance between the resin ring 23 and the piston rod 20 is smaller than the radial distance between the guide bushing 19 and the piston rod 20. Accordingly, the resin ring 23 restricts the oil in the cylinder 11 from flowing through between the guide bushing 19 and the piston rod 20 toward the other axial end.

(Rod Guide 15)

Next, the rod guide 15 will be described in more detail.

Figure 3:
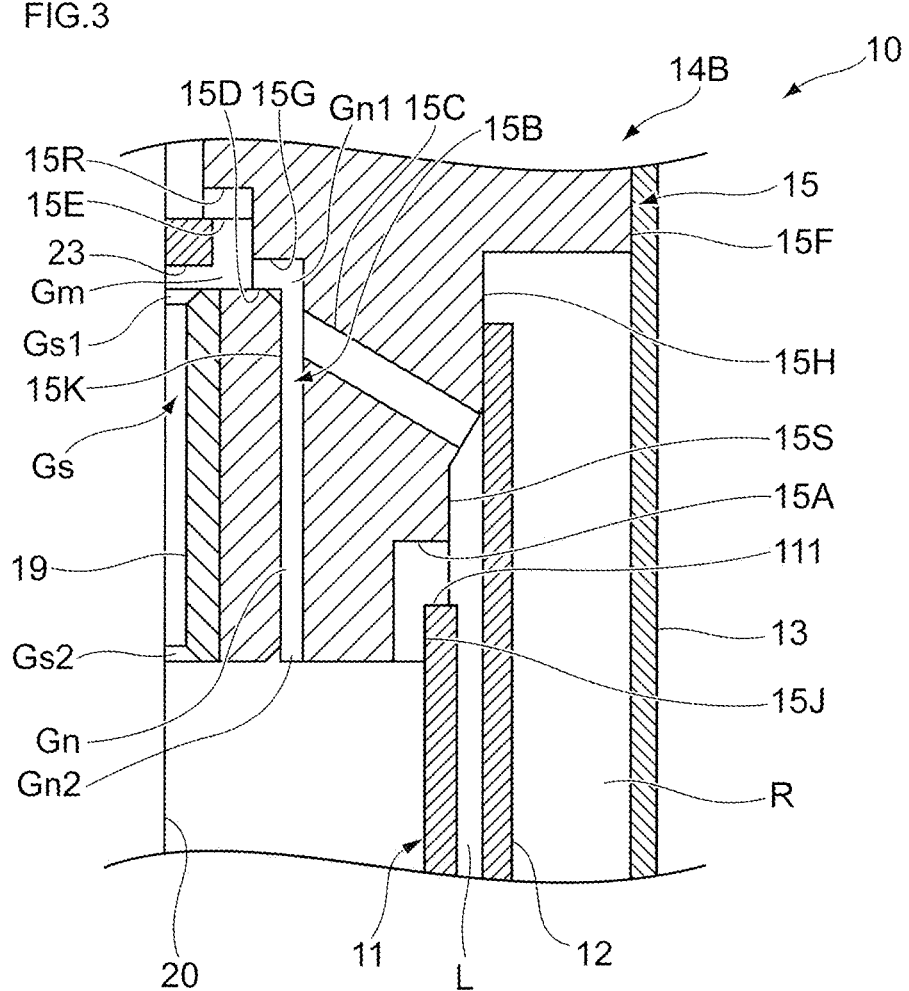
FIG. 3 is a diagram illustrating the details of the vicinity of a rod guide in the exemplary embodiment.

FIG. 3 is a diagram for illustrating the details of the rod guide 15 of the exemplary embodiment. FIG. 3 shows a cross section along III-III of FIG. 4-2B.

Figures 1A, 4:
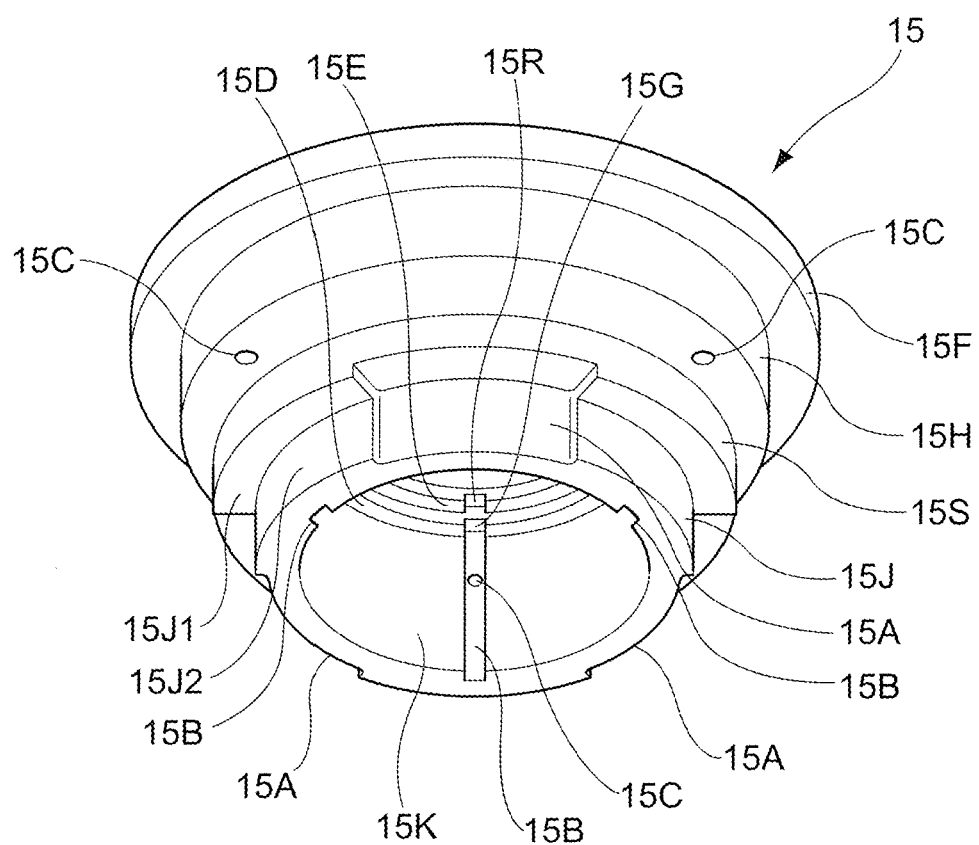
FIG. 4-1A is a schematic diagram of the configuration of the rod guide in the exemplary embodiment.
Figures 2B, 4:
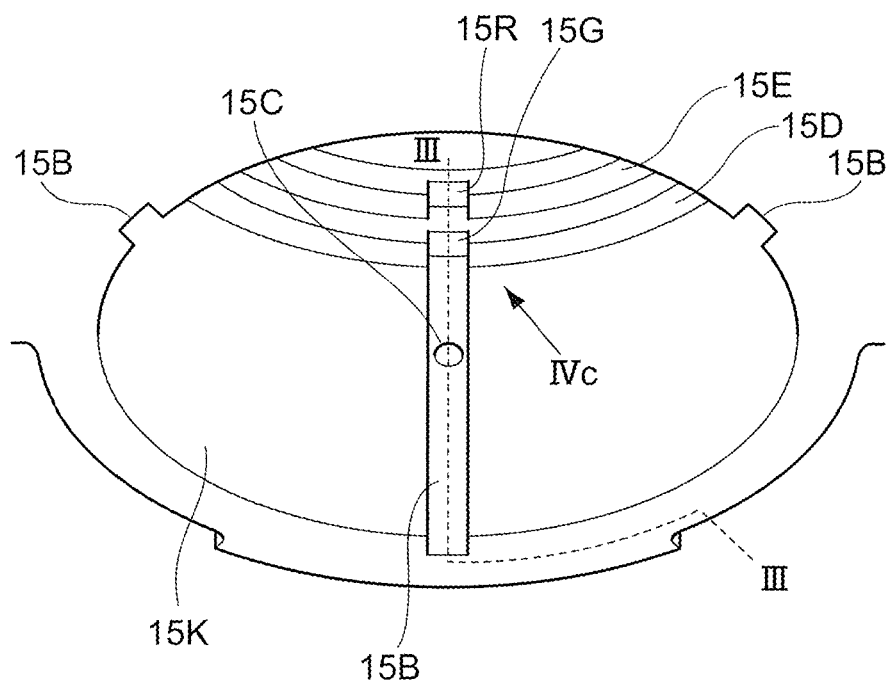
Figures 2C, 4:
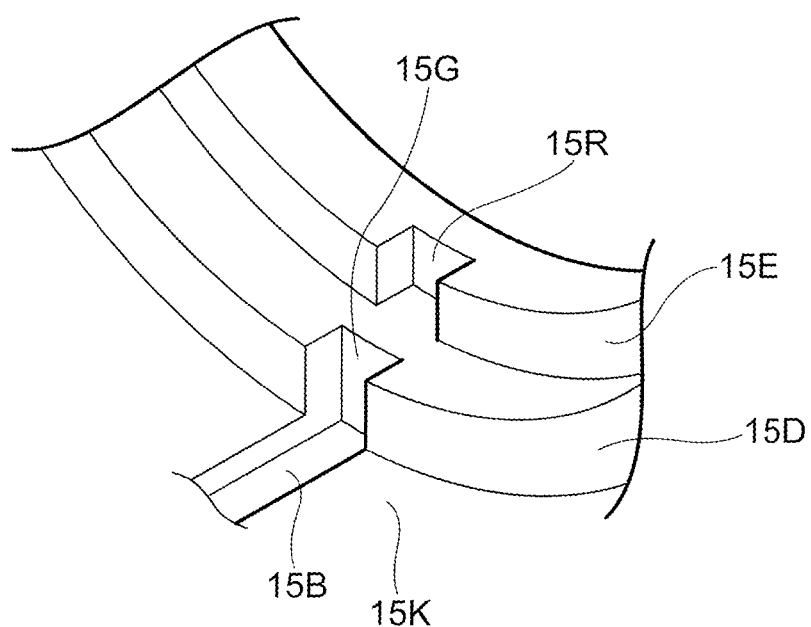

FIG. 4-1A is a schematic diagram of the configuration of the rod guide 15 of the exemplary embodiment. FIG. 4-2B is an enlarged view seen from the inside of the rod guide 15 of the exemplary embodiment, and FIG. 4-2C is a view seen from the direction of an arrow IVc in FIG. 4-2B.

The rod guide 15 is a cylindrical member as a whole. The rod guide 15 has an outer diameter that becomes smaller from the other axial end to the one end. More specifically, as shown in FIG. 4-1A, the rod guide 15 has a first diameter part 15F, a second diameter part 15H, a third diameter part 15S, and a fourth diameter part 15J, in this order from the other axial end toward the one end (from the upper end toward the lower end in the drawings). The outer diameters of the first to fourth diameter parts 15F, 15H, 15S, and 15J become smaller in this order.

This rod guide 15 is provided at a position where the rod guide 15 covers the other axial end of the cylinder part 10 (an end of the cylinder 11 where the piston rod 20 protrudes). The rod guide 15 is an example of a base and a cover member. The rod guide 15 and the guide bushing 19 described above are also an example of the cover member.

When fitted to the other axial end of the cylinder part 10, the respective parts of the rod guide 15 are set as follows. The first diameter part 15F is fitted to the damper case 13, the second diameter part 15H is fitted to the outer tube 12, and the fourth diameter part 15J is fitted to the cylinder 11, as shown in FIG. 3. A stepped surface 15J1 between the third diameter part 15S and the fourth diameter part 15J comes into a state to abut the other end of the cylinder 11.

The rod guide 15 has outer circumferential grooves 15A, inner circumferential grooves 15B, through holes 15C, a first receiving portion 15D, a second receiving portion 15E, first orifices 15G, and second orifices 15R. These parts will each be described in detail below.

First, the outer circumferential groove 15A is a cavity formed in a region of the outer circumferential surface of the rod guide 15 facing the cylinder 11 (see FIG. 3), and is a portion recessed from the outer circumferential surface thereof, as shown in FIG. 4-1A.

In a specific example shown in the figure, there are plural (three in the exemplary embodiment) of outer circumferential grooves 15A in the circumferential direction of the rod guide 15. The circumferential grooves 15A are formed continuously from the stepped surface 15J1 to the outer circumferential side face 15J2 of the fourth diameter part 15J.

The inner circumferential groove 15B is formed along the axial direction in the inner circumferential surface 15K of the rod guide 15 as shown in FIG. 4-1A. In a specific example shown in the figure, there are provided plural (three in the exemplary embodiment) of inner circumferential grooves 15B in the circumferential direction of the rod guide 15. The inner circumferential grooves 15B in the illustrated example are located offset from the outer circumferential grooves 15A in the circumferential direction of the rod guide 15.

The through hole 15C is a hole that extends through the rod guide 15 in the radial direction. In the specific example shown in the figure, there are plural (three in the exemplary embodiment) of through holes 15C in the circumferential direction of the rod guide 15.

The radially inner end of the through hole 15C is located inside the inner circumferential groove 15B (see FIG. 4-2B). The radially outer end of the through hole 15C is located in a region of the outer circumferential surface of the rod guide 15 facing the fluid communication path L.

The through hole 15C is inclined with respect to the axial direction, as shown in FIG. 3, so that the radially outer end thereof is positioned closer to one axial end (lower end in the drawings) than the radially inner end.

The first receiving portion 15D is a protruding portion protruding radially inward from the inner circumferential surface 15K of the rod guide 15 at the other axial end of the rod guide 15. The first receiving portion 15D is located closer to the other axial end than the guide bushing 19.

The first receiving portion 15D has an inner diameter that is larger than the outer diameter of the piston rod 20 and smaller than the outer diameter of the guide bushing 19. The inner diameter of the first receiving portion 15D is larger than the outer diameter of the resin ring 23.

When the guide bushing 19 is fitted to the inner circumference of the rod guide 15, the other axial end of the guide bushing 19 abuts on the first receiving portion 15D. The first receiving portion 15D thus determines the axial position of the guide bushing 19 relative to the rod guide 15.

The second receiving portion 15E is a protruding portion protruding radially inward from the inner circumferential surface 15K of the rod guide 15 at a position axially closer to the other axial end of the rod guide 15 than the first receiving portion 15D. The second receiving portion 15E is located closer to the other axial end than the resin ring 23.

The second receiving portion 15E has an inner diameter that is larger than the outer diameter of the piston rod 20 and smaller than the inner diameter of the first receiving portion 15D. The inner diameter of the second receiving portion 15E is smaller than the outer diameter of the resin ring 23. The second receiving portion 15E receives the axially moving resin ring 23 and limits the movement range of the resin ring 23.

The first orifice 15G is a cavity recessed in one surface in the axial direction of the first receiving portion 15D as shown in FIG. 4-2C. This first orifice 15G is formed along the radial direction in one surface of the first receiving portion 15D. The radially inner end of the first orifice 15G opens in the inner circumferential surface of the first receiving portion 15D.

In a specific example shown in the figure, there are plural first orifices 15G arranged in the circumferential direction of the rod guide 15. The first orifices 15G are located at circumferentially corresponding (matching) positions of the rod guide 15 to be continuous with the inner circumferential grooves 15B.

The second orifice 15R is a cavity recessed in one surface in the axial direction of the second receiving portion 15E as shown in FIG. 4-2C. This second orifice 15R is formed along the radial direction in one surface of the second receiving portion 15E. The radially inner end of the second orifice 15R opens in the inner circumferential surface of the second receiving portion 15E.

In a specific example shown in the figure, there are plural second orifices 15R arranged in the circumferential direction of the rod guide 15.

(Oil Passages Around the Rod Guide 15)

Next, the oil passages formed around the rod guide 15 will be described with reference to FIG. 3, FIG. 4-1A, FIG. 4-2B, and FIG. 4-2C.

As mentioned above, the guide bushing 19 is provided around the piston rod 20. The inner diameter of the guide bushing 19 is larger than the outer diameter of the piston rod 20. Therefore, there is a space, which is here referred to as an inner circumferential gap Gs, between the outer circumferential surface of the piston rod 20 and the inner circumferential surface of the guide bushing 19.

The first orifices 15G are formed in one surface in the axial direction of the first receiving portion 15D of the rod guide 15. These first orifices 15G form spaces between the other end of the guide bushing 19 and one surface of the first receiving portion 15D. To be more specific, because of the first orifices 15G, there are formed axial gaps Gm, which are spaces in which the space formed between the other end of the guide bushing 19 and one surface of the first receiving portion 15D is continuous with a space between the other end of the guide bushing 19 and one surface of the second receiving portion 15E.

The rod guide 15 has the inner circumferential grooves 15B. These inner circumferential grooves 15B form spaces, which are here referred to as an outer circumferential gaps Gn, between the inner circumferential surface 15K of the rod guide 15 and the outer circumferential surface of the guide bushing 19.

The inner circumferential gap Gs, axial gaps Gm, and outer circumferential gaps Gn communicate with each other to form continuous oil passages. The axial gaps Gm and the outer circumferential gaps Gn function as oil passages for discharging the oil that has entered the inner circumferential gap Gs to outside of the cylinder 11.

The through holes 15C function as oil passages for letting oil flow from the outer circumferential gaps Gn to the fluid communication path L.

The through hole 15C is an example of a branch passage. Namely, the through hole 15C branches from the outer circumferential gap Gn to let the fluid flow into the reserving chamber R.

The rod guide 15 has the outer circumferential grooves 15A. These outer circumferential grooves 15A form gaps between the rod guide 15 and the cylinder 11. These gaps function as passages for letting oil flow from inside of the cylinder 11 to the reserving chamber R via the fluid communication path L.

The outer circumferential groove 15A is an example of an opening. Namely, the outer circumferential groove 15A is formed by being apart at least a circumferential portion of the rod guide from the cylinder 11 to let the fluid flow from inside of the cylinder 11 to the reserving chamber R (via the fluid communication path L).

Furthermore, the second receiving portion 15E of the rod guide 15 has the second orifices 15R. These second orifices 15R form gaps between the second receiving portion 15E of the rod guide 15 and the resin ring 23. These gaps function as passages for letting oil flow from between the guide bushing 19 and the piston rod 20 to the oil seal 16.

Now, the positional relationship between the inner circumferential gap Gs, outer circumferential gaps Gn, and outer circumferential grooves 15A, which all form oil passages, will be described with reference to FIG. 3. The inner circumferential gap Gs, outer circumferential gaps Gn, and outer circumferential grooves 15A are located in this order from inside to outside in the radial direction. One end Gs2 (lower end in the drawing) of the inner circumferential gap Gs is at a longer distance away from the outer circumferential grooves 15A than the one end Gn2 of the outer circumferential gaps Gn.

(Flows of Oil Around the Rod Guide 15)

Next, the flows of oil around the rod guide 15 disposed at the other end of the cylinder part 10 will be described with reference to FIG. 2, FIG. 5A and FIG. 5B.

Figure 5A:
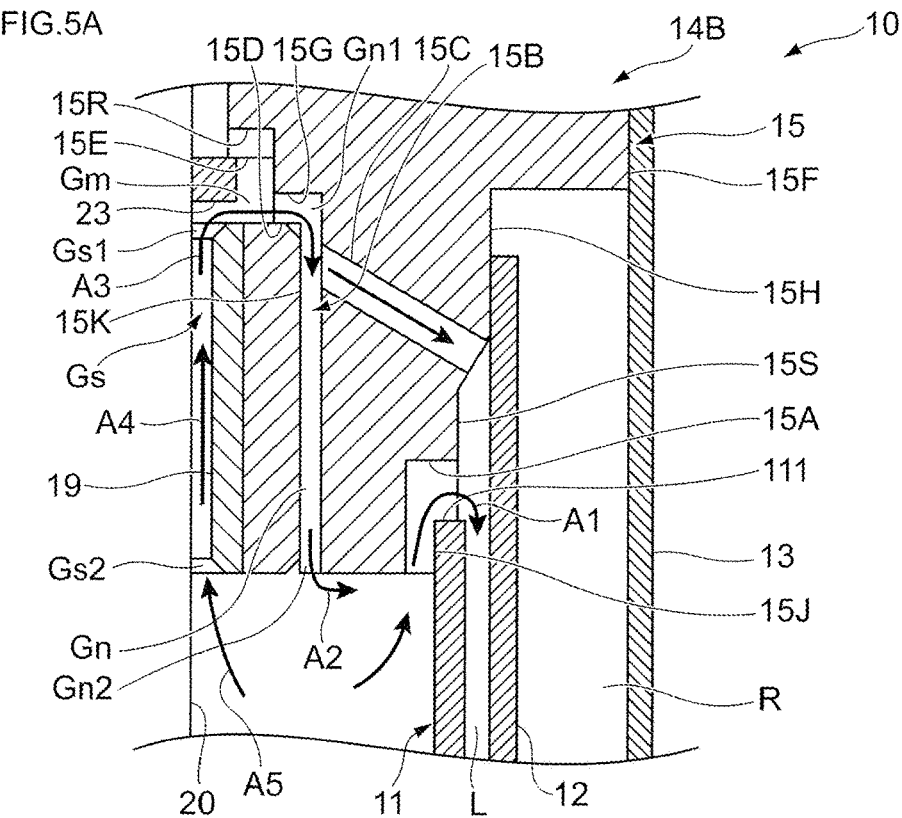
FIG. 5A is a diagram illustrating the flows of oil around the rod guide in the exemplary embodiment.
Figure 5B:
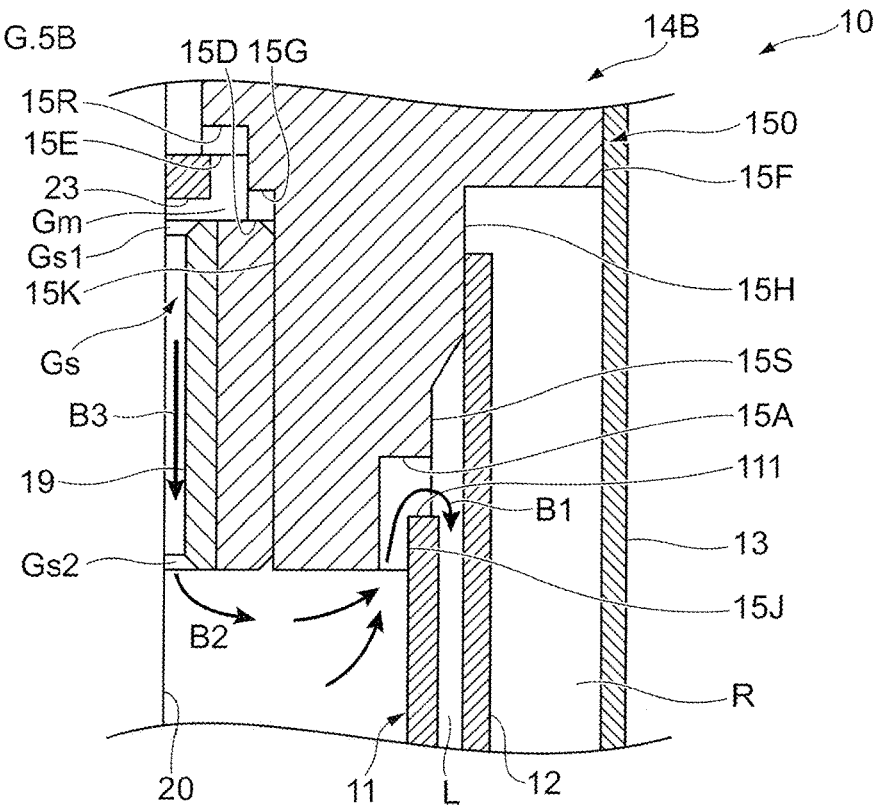
FIG. 5B is a diagram illustrating the flows of oil around a rod guide different from that of the exemplary embodiment.

FIG. 5A is a diagram illustrating the flows of oil around the rod guide 15 of the exemplary embodiment, and FIG. 5B is a diagram illustrating the flows of oil around a rod guide 150 different from that of the exemplary embodiment.

First, with vibration applied to the vehicle or the like, the piston rod 20 and the piston 30 move inside the cylinder 11.

This causes the oil to flow out from the cylinder 11 to the fluid communication path L via the outer circumferential grooves 15A, as shown in FIG. 5A (see arrow A1).

The oil flow path area of each outer circumferential groove 15A is smaller than the flow path area of the cylinder 11. Therefore, the flow velocity of the oil flowing from inside of the cylinder 11 into the fluid communication path L increases in or around the outer circumferential grooves 15A. Accordingly, a pressure level around the outer circumferential grooves 15A becomes negative.

The negative pressure around the outer circumferential grooves 15A leads the oil in the outer circumferential gaps Gn, which are located closer to the outer circumferential grooves 15A than the inner circumferential gap Gs, to the outer circumferential grooves 15A. More specifically, the oil in the outer circumferential gaps Gn moves from the other end Gn1 to the one end Gn2, exits from the one end Gn2, and is led to the outer circumferential grooves 15A (see arrow A2). This movement of the oil inside the outer circumferential gaps Gn causes the oil in the axial gaps Gm and the inner circumferential gap Gs to move into the outer circumferential gaps Gn (see arrows A3 and A4).

Oil flows from the one end Gs2 to the other end Gs1 (from lower side to upper side in the drawing) inside the inner circumferential gap Gs. Along with this flow of oil inside the inner circumferential gap Gs, the oil in the cylinder 11 flows into the inner circumferential gap Gs (see arrow A5). That is, oil in the cylinder 11 is supplied into the inner circumferential gap Gs.

Now, the flows of oil around a rod guide 150 different from that of the exemplary embodiment will be described with reference to FIG. 5B. Unlike the exemplary embodiment described above, the inner circumferential grooves 15B and the through holes 15C are not formed in this rod guide 150.

In this configuration, too, when oil flows from inside of the cylinder 11 into the fluid communication path L via the outer circumferential grooves 15A (see arrow B1), a pressure level around the outer circumferential grooves 15A becomes negative. This causes the oil inside the inner circumferential gap Gs to exit from the one end Gs2 and is led to the outer circumferential grooves 15A (see arrow B2). Then, a flow of oil from the other end Gs1 to the one end Gs2 in the inner circumferential gap Gs occurs (see arrow B3). Therefore, oil inside the cylinder 11 can hardly be supplied into the inner circumferential gap Gs.

On the other hand, with the present exemplary embodiment shown in FIG. 5A, oil can easily be supplied into the inner circumferential gap Gs as compared to the configuration shown in FIG. 5B. Accordingly, wear of the guide bushing 19 due to the piston rod 20 can be prevented. As a result, deterioration of durability of the hydraulic shock absorber 1 (see FIG. 2) of the exemplary embodiment is suppressed, compared to a configuration where the inner circumferential grooves 15B is not formed.

In the exemplary embodiment shown in FIG. 5A, the through holes 15C that are continuous with the outer circumferential gaps Gn are formed as described above. As oil in the outer circumferential gaps Gn is discharged through the through holes 15C, the oil inside the inner circumferential gap Gs is easily discharged via the outer circumferential gaps Gn.

Moreover, the through holes 15C shown in the figure are inclined relative to the axial direction. Accordingly, oil can readily flow from the outer circumferential gaps Gn into the fluid communication path L.

The inner circumferential grooves 15B in the exemplary embodiment of FIG. 5A are an example of fluid supply unit. Namely, the inner circumferential grooves 15B supply fluid into the inner circumferential gap Gs between the inner circumferential surface of the guide bushing 19 and the outer circumferential surface of the piston rod 20.

The axial gap Gm and the outer circumferential gap Gn are an example of a flow forming passage. Namely, the axial gap Gm and the outer circumferential gap Gn form a flow of fluid along the axial direction of the cylinder 11 from inside to outside of the cylinder 11 in the inner circumferential gap Gs. One of the axial gap Gm and the outer circumferential gap Gn communicates with the inner circumferential gap Gs, while the other is located closer to the outer circumferential groove 15A than the inner circumferential gap Gs. The outer circumferential gap Gn is formed between the inner circumferential surface 15K of the rod guide 15 and the outer circumferential surface of the guide bushing 19.

The inner circumferential grooves 15B can also be understood as having a function of flowing oil from the one end Gs2 to the other end Gs1 inside the inner circumferential gap Gs.

Further, the inner circumferential grooves 15B can be understood as having a function of discharging oil from inside of the inner circumferential gap Gs not from the one end Gs2 of the inner circumferential gap Gs but from the other end Gs1.

(Modified Examples of Rod Guide 15)

Now, modified examples of the rod guide 15 will be described.

The following modified examples of the rod guide 15 will be described mainly with respect to the features different from the previously described rod guide 15. Same or similar features as the rod guide 15 described in the foregoing will be given the same reference numerals and will not be described again in detail.

(Modified Example 1)

Figure 6A:
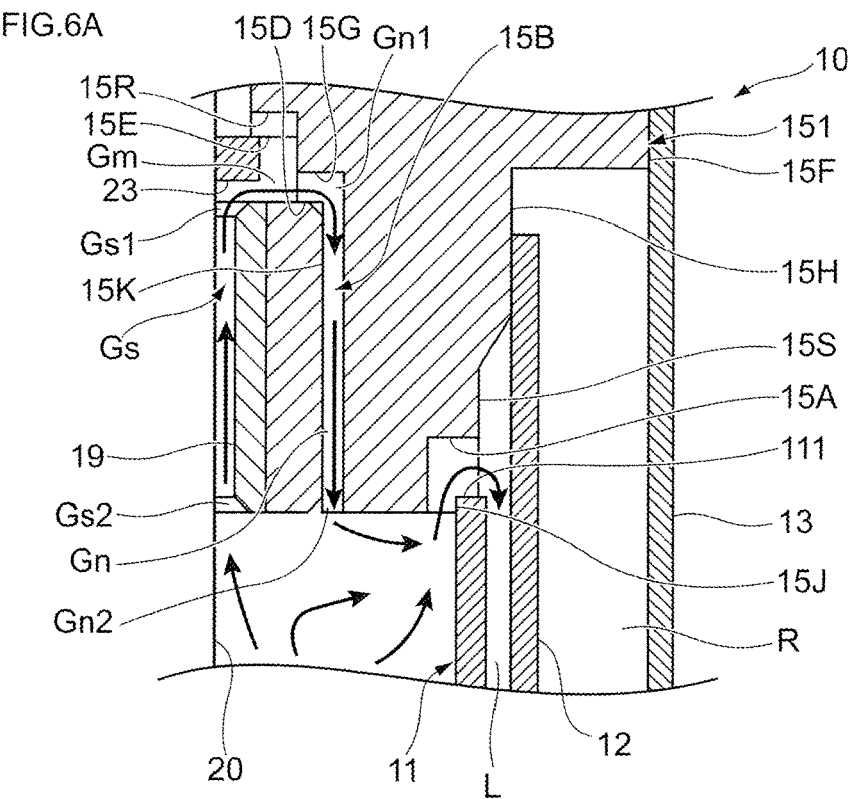
FIG. 6A and FIG. 6B are diagrams illustrating a modified example 1 of the rod guide.
Figure 6B:
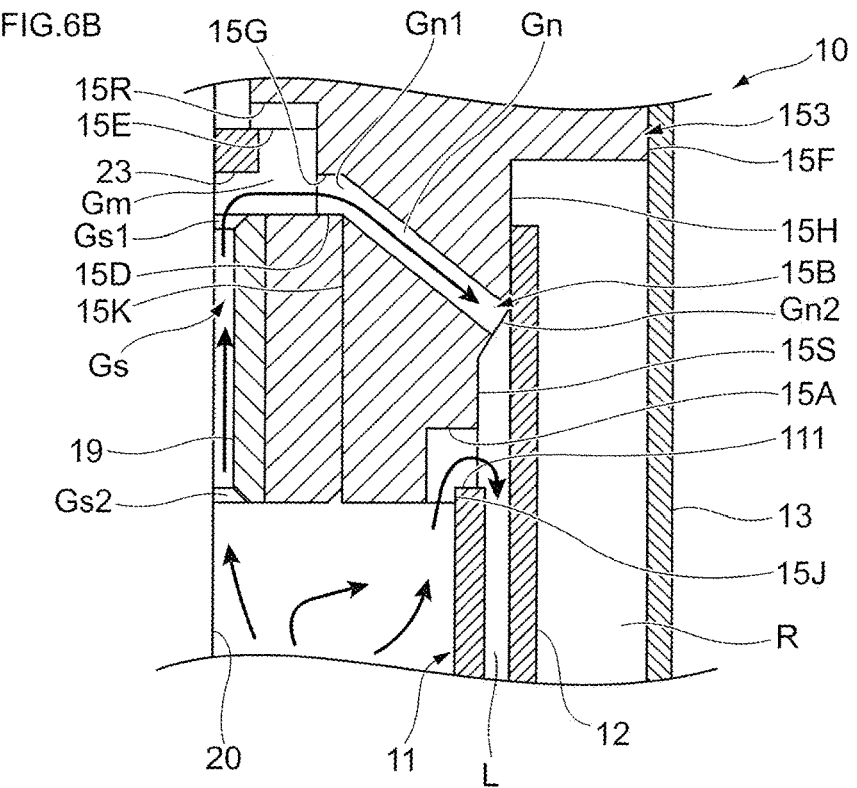

FIG. 6A and FIG. 6B are diagrams illustrating modified example 1 of the rod guide 15.

In the exemplary embodiment shown in FIG. 3, a configuration in which the rod guide 15 has the inner circumferential grooves 15B and the through holes 15C is described. The rod guide 15, however, does not necessarily need the through holes 15C as long as the inner circumferential grooves 15B is provided, as shown in FIG. 6A.

In the exemplary embodiment shown in FIG. 3, it is described that the inner circumferential grooves 15B extend along the axial direction in the inner circumferential surface 15K of the rod guide 15. The inner circumferential groove 15B may be configured otherwise, as long as one end thereof communicates with the axial gap Gm and the other end opens at a position closer to the outer circumferential groove 15A than the one end Gs2 of the inner circumferential gap Gs.

Therefore, for example, as shown in FIG. 6B, the inner circumferential groove 15B of the rod guide 153 may be formed to penetrate through the rod guide 153 in a direction inclined with respect to the axial direction.

(Modified Example 2)

FIG. 7A and FIG. 7B are diagrams illustrating modified example 2 of the rod guide 15.

The rod guide 155 in the modified example shown in FIG. 7A has a protrusion 15M, which is an example of fluid supply unit, instead of the inner circumferential grooves 15B in the exemplary embodiment shown in FIG. 3.

This protrusion 15M is a portion protruding from one surface in the axial direction of a rod guide 155 (a base)

toward one end (toward inside of the cylinder 11) further than one end of the guide bushing 19 (an annular portion) and than the other end 111 of the cylinder 11 (see the broken line in the drawing) in the axial direction of the cylinder 11. The protrusion 15M is located between the one end Gs2 of the inner circumferential gap Gs and the outer circumferential grooves 15A.

The protrusion 15M is provided at a position on the outer side in the radial direction than the guide bushing 19. Thereby, the protrusion 15M does not obstruct flow of the oil from inside of the cylinder 11 into the inner circumferential gap Gs.

Next, the flows of oil around the rod guide 155 will be described.

The protrusion 15M is located between the one end Gs2 of the inner circumferential gap Gs and the outer circumferential grooves 15A, as mentioned above. The protrusion 15M thereby makes it harder for the oil to flow from the one end Gs2 of the inner circumferential gap Gs to the outer circumferential grooves 15A, compared to the configuration without the protrusion 15M unlike the illustrated example.

In this configuration, even when oil flows into the outer circumferential grooves 15A so thaa pressure level around the outer circumferential grooves 15A becomes negative, the oil inside the inner circumferential gap Gs cannot easily flow toward the outer circumferential grooves 15A, compared to the configuration without the protrusion 15M.

Accordingly, the protrusion 15M prevents the oil from being discharged from the one end Gs2 of the inner circumferential gap Gs. As a result, a lack of oil inside the inner circumferential gap Gs is prevented.

When oil flows from one side to the other in the axial direction in the cylinder 11 (from lower side to upper side in the drawing) with the vibration applied to the vehicle or the like, the protrusion 15M guides some of the oil to flow into the inner circumferential gap Gs. That is, oil is supplied into the inner circumferential gap Gs.

Namely, the protrusion 15M functions as an example of a fluid supply unit that supplies oil into the inner circumferential gap Gs. The protrusion 15M increases the amount of oil inside the inner circumferential gap Gs, as compared to the configuration without the protrusion 15M.

The protrusion 15M has a slope 15I on the outer circumferential side facing the cylinder 11 as shown in FIG. 7A. This slope 15I is formed such that the diameter increases from one side to the other side in the axial direction.

The slope 15I makes it easier for the oil to flow from inside of the cylinder 11 into the outer circumferential grooves 15A.

The protrusion (a fluid supply unit) 15M may have a recessed portion 15N in the inner circumferential surface facing the piston rod 20 closer to one side in the axial direction than the guide bushing 19, as shown in FIG. 7B. Forming the recessed portion 15N increases the flow path area of oil moving in the axial direction on one side of the inner circumferential gap Gs. As a result, the oil pressure becomes higher around the recessed portion 15N than in the inner circumferential gap Gs, so that oil inside the inner circumferential gap Gs hardly flows toward the outer circumferential grooves 15A. In other words, oil supply into the inner circumferential gap Gs is promoted.

Although not shown in the figure, the inner circumferential grooves 15B in the exemplary embodiment shown in FIG. 3 may be provided in the rod guides 155 and 157 of the modified examples shown in FIG. 7A and FIG. 7B. That is, the rod guide 155 or 157 may include both of the protrusion 15M and the inner circumferential grooves 15B. Moreover, the rod guide 155 or 157 including both of the protrusion 15M and the inner circumferential grooves 15B may further include the through holes 15C.

The protrusion 15M can also be understood as a partition wall having a function of preventing oil inside the inner circumferential gap Gs from flowing into the outer circumferential grooves 15A.

(Modified Example 3)

In the exemplary embodiment shown in FIG. 3, it is described that the outer circumferential grooves 15A are formed in the outer circumferential surface of the rod guide 15. Instead of providing such grooves, a gap can be formed between the outer circumferential surface of the rod guide 15 and the cylinder 11 in various other ways.

For example, the rod guide 15 may have a protruding portion protruding from its outer circumferential surface toward the cylinder 11. Alternatively, the cylinder 11 may have a cavity recessed from a surface facing the rod guide 15, or a protruding portion protruding toward the rod guide 15. Further, the cylinder 11 may have a through hole extending in the radial direction at the other end of the cylinder 11.

In the exemplary embodiment shown in FIG. 3, it is described that the inner circumferential grooves 15B are formed in the inner circumferential surface 15K of the rod guide 15. Instead of providing such grooves, a gap can be formed between the inner circumferential surface 15K of the rod guide 15 and the outer circumferential surface of the guide bushing 19 in various other ways.

For example, the rod guide 15 may have a protruding portion protruding from its inner circumferential surface 15K toward the guide bushing 19. Alternatively, the guide bushing 19 may have a cavity recessed from an outer circumferential surface facing the rod guide 15, or a protruding portion protruding toward the rod guide 15.

While the inner circumferential grooves 15B and the through holes 15C of the rod guide 15 shown in FIG. 4-1A are located at different positions from those of the outer circumferential grooves 15A in the circumferential direction of the rod guide 15, the inner circumferential grooves 15B and the through holes 15C may be provided at corresponding (matching) positions in the circumferential direction to coincide with the outer circumferential grooves 15A.

In the exemplary embodiment shown in FIG. 3, it is described that the first orifices 15G are formed in the first receiving portion 15D. Instead of forming such orifices, a gap can be formed between the other end of the guide bushing 19 and one surface of the first receiving portion 15D in various other ways.

For example, the first receiving portion 15D may have protrusions or the like protruding from one surface in the axial direction of the first receiving portion 15D. It should be noted that the amount of oil flowing into the outer circumferential gaps Gn through the axial gaps Gm can be adjusted by suitably setting the axial lengths of the first orifices 15G or protrusions and the like.

In the exemplary embodiment shown in FIG. 3, the second orifices 15R are formed in the second receiving portion 15E. However, the exemplary embodiment is not limited to such a configuration, and the second orifices 15R may not be provided, for example.

Alternatively, a gap can be formed between the resin ring 23 and the second receiving portion 15E with a different configuration. For example, the second receiving portion 15E may have protrusions or the like protruding from one surface in the axial direction of the second receiving portion 15E. It should be noted that the amount of oil flowing to the oil seal 16 and the amount of oil flowing into the outer circumferential gaps Gn can be adjusted by suitably setting the axial lengths of the second orifices 15R or protrusions and the like.

(Modified Examples of Resin Ring 23)

Modified examples of the resin ring 23 shown in FIG. 3 will be described. In the following description, different features from the resin ring 23 of the exemplary embodiment described above will be mainly explained.

FIG. 8A to FIG. 8D are diagrams illustrating modified examples of the resin ring 23.

As shown in FIG. 8A, recessed portions 23A may be formed in one surface 23O of a resin ring 231. The recessed portions 23A increase the gaps between the resin ring 231 and the guide bushing 19. These recessed portions 23A facilitate the oil flow radially from inside to outside in the axial gaps Gm (see FIG. 3).

In the specific example shown in FIG. 8A, plural recessed portions 23A are formed circumferentially with predetermined intervals therebetween in the one surface 23O.

While the recessed portions 23A are substantially rectangular when viewed from a side of the resin ring 231 in the specific example of FIG. 8A, the recessed portions 23A may instead have a triangular shape (see notches 23B of a resin ring 233 shown in FIG. 8B), or may have any other shapes such as other polygonal shapes or a semi-circular shape and the like.

Further, it is described that the resin ring 231 or 233 has recessed portions 23A or notches 23B in the one surface 23O. However, the resin ring may be configured otherwise, as long as the gaps between the resin ring 231 or 233 and the guide bushing 19 can be increased. For example, the resin ring 231 or 233 may have protruding portions protruding from the one surface 23O toward the guide bushing 19.

The resin ring 23 need not be one-piece, but may be composed of two or more parts.

For example, as shown in FIG. 8C, a resin ring 235 may include a first tubular member 23C and a second tubular member 23D stacked upon the first tubular member 23C in the axial direction. In the specific example shown in the figure, recessed portions 23E are formed in the one surface 23O of the second tubular member 23D.

Dividing the resin ring 235 into plural parts in this way allows formation of the respective parts with different materials from each other, or use of a general-purpose article for any parts of the resin ring.

Alternatively, as shown in FIG. 8D, a resin ring 237 may include a tubular member 23F, and a disc-like member 23G stacked upon the tubular member 23F in the axial direction. The disc-like member 23G is undulating on both sides. The disc-like member 23G in the specific example shown in the figure is a so-called wave washer.

(Modified Examples of Guide Bushing 19)

Modified examples of the guide bushing 19 shown in FIG. 3 will be described. In the following description, different features from the guide bushing 19 of the exemplary embodiment described above will be mainly explained.

Figure 9A:
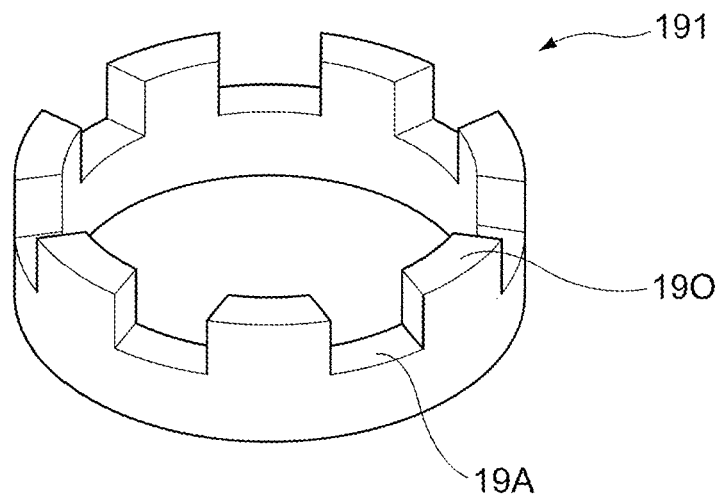
FIG. 9A and FIG. 9B are diagrams illustrating modified examples of a guide bushing.
Figure 9B:
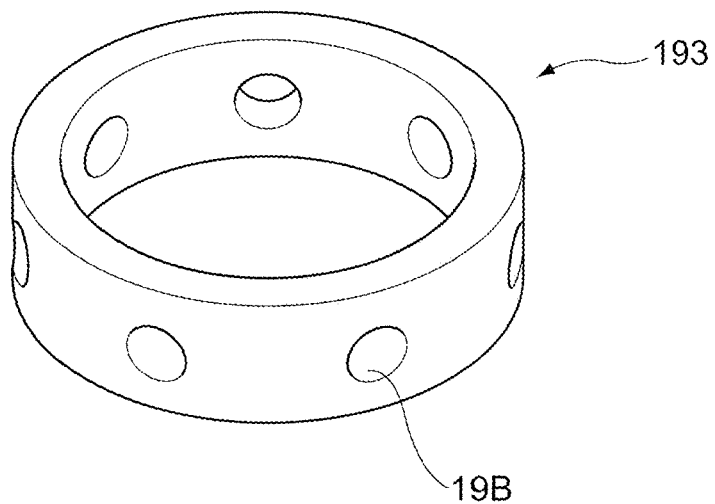
Figure 10:
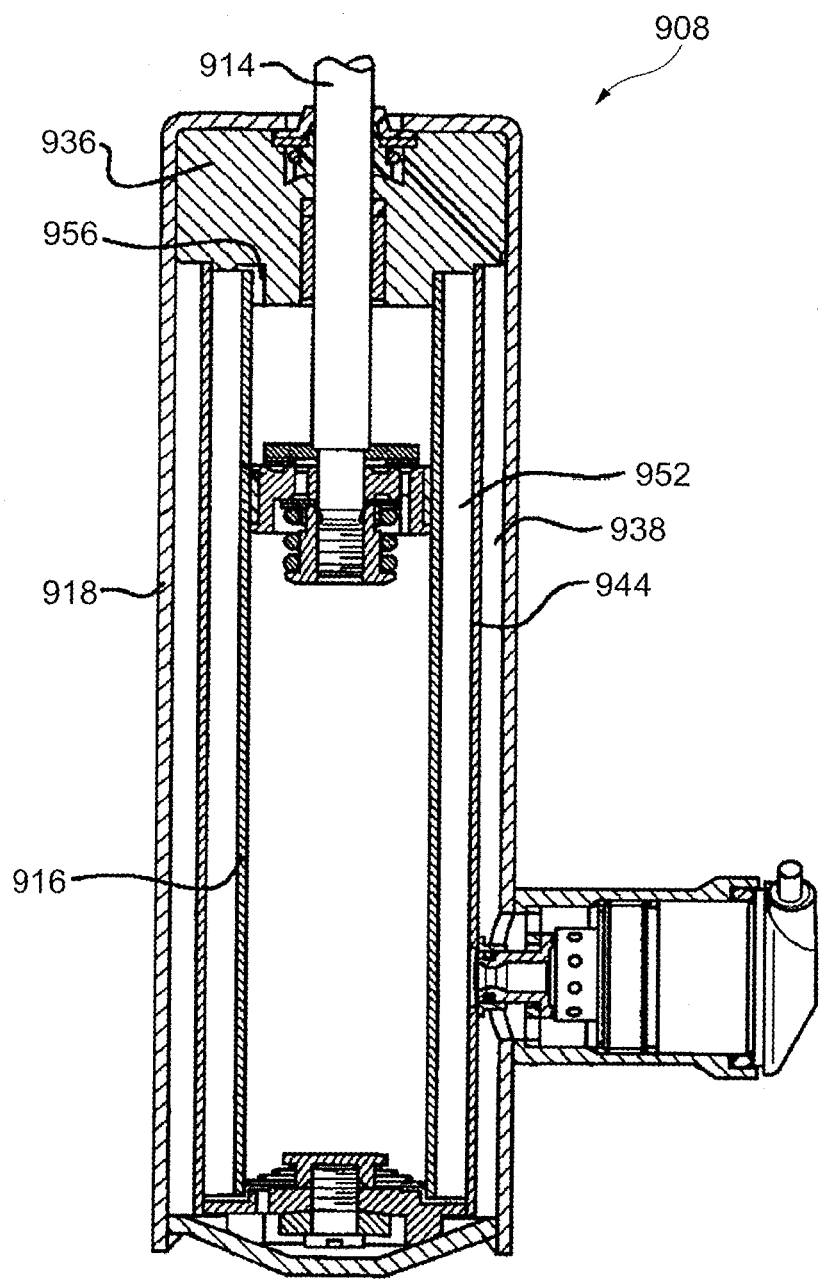
FIG. 10 is a diagram illustrating a shock absorber of a related art.

FIG. 9A and FIG. 9B are diagrams illustrating modified examples of the guide bushing 19.

As shown in FIG. 9A, recessed portions 19A may be formed in a surface 19O on the other side of a guide bushing 191. The recessed portions 19A increase the gaps between the resin ring 23 (see FIG. 3) and the guide bushing 191. These recessed portions 19A facilitate the oil flow radially from inside to outside in the axial gaps Gm (see FIG. 3).

In the specific example shown in the figure, plural recessed portions 19A are formed circumferentially with predetermined intervals therebetween in the surface 19O on the other side.

While the recessed portions 19A are substantially rectangular when viewed from a side of the guide bushing 191 in the specific example of FIG. 9A, the recessed portions 19A may instead have triangular or other shapes. Further, the guide bushing 191 may have protruding portions protruding from the one surface 19O on the other side toward the resin ring 23.

Further, as shown in FIG. 9B, a guide bushing 193 may have through holes 19B penetrating from inner circumference to the outer circumference. Around the center in the axial direction of the guide bushing 193, one end of the through holes 19B is opened to the inner circumferential surface, and the other end of the through holes 19B is opened to the outer circumferential surface. These through holes 19B communicate the inner circumferential gap Gs with the outer circumferential gaps Gn (see FIG. 3) and facilitate the discharge of oil from inside of the inner circumferential gap Gs.

(Other Modified Examples)

The exemplary embodiment shown in FIG. 3 has been described above as having a so-called triple tube structure configured with the cylinder 11, the outer tube 12, and the damper case 13. However, the upper lid 14B described above can of course be applied to a so-called double tube structure configured with a first cylinder and a second cylinder arranged outside of the first cylinder.

What is claimed is:

1. A hydraulic shock absorber, comprising:
   a first cylinder containing a fluid;
   a second cylinder positioned outside the first cylinder and forming a fluid reserving chamber that reserves the fluid between the second cylinder and the first cylinder;
   a piston housed inside the first cylinder;
   a piston rod supporting the piston, a part of the piston rod protruding from the first cylinder; and
   a cover member covering one end of the first cylinder from which the piston rod protrudes, and having a through hole through which the piston rod penetrates, wherein
   at least a part of the cover member in a circumferential direction of the first cylinder is apart from the first cylinder to form an opening through which the fluid flows from inside of the first cylinder to the fluid reserving chamber,
   the cover member includes a fluid supply unit through which the fluid flows into a gap formed between an inner circumferential surface of the cover member defining the through hole and an outer circumferential surface of the piston rod,
   the fluid supply unit includes a flow forming passage that helps direct the fluid flow from the first cylinder into the gap, said flow forming passage extending along an axial direction of the first cylinder,
   a radial distance between the opening and the flow forming passage is shorter than a radial distance between the opening and the gap, and
   the flow forming passage extends parallel to the axial direction of the first cylinder.

2. The hydraulic shock absorber according to claim 1, further comprising a third cylinder that is provided between the first cylinder and the second cylinder, forms the fluid reserving chamber between the third cylinder and the second cylinder, and forms a flow path through which the fluid flows into the fluid reserving chamber between the third cylinder and the first cylinder, wherein the cover member includes a base that covers the one end of the first cylinder from which the piston rod protrudes, and an annular portion that is an annular member provided on an inner side of the base and provided with the through hole, and the cover member forms the flow forming passage between an inner circumferential surface of the base and an outer circumferential surface of the annular portion.

3. The hydraulic shock absorber according to claim 1, wherein the fluid supply unit includes a branch passage that branches from the flow forming passage to cause the fluid to flow into the fluid reserving chamber.

4. The hydraulic shock absorber according to claim 3, wherein the branch passage extends through the cover member in a radial direction of the first cylinder.

5. The hydraulic shock absorber according to claim 4, wherein one end of the branch passage is located inside of the first cylinder in a radial direction of the first cylinder.

\* \* \* \* \*